281-47
39
T 281/47
NO PRINTED SPECIFICATION AVAILABLE
J. B. McEnally.
Temporary Binder.
No. 300. A.I. Patented Oct 2, 1860.
1936
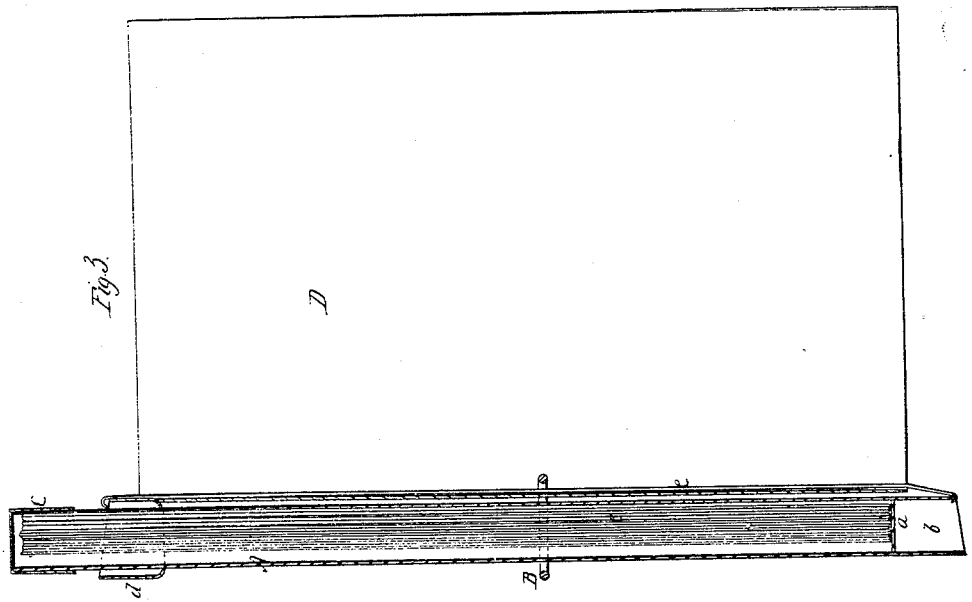
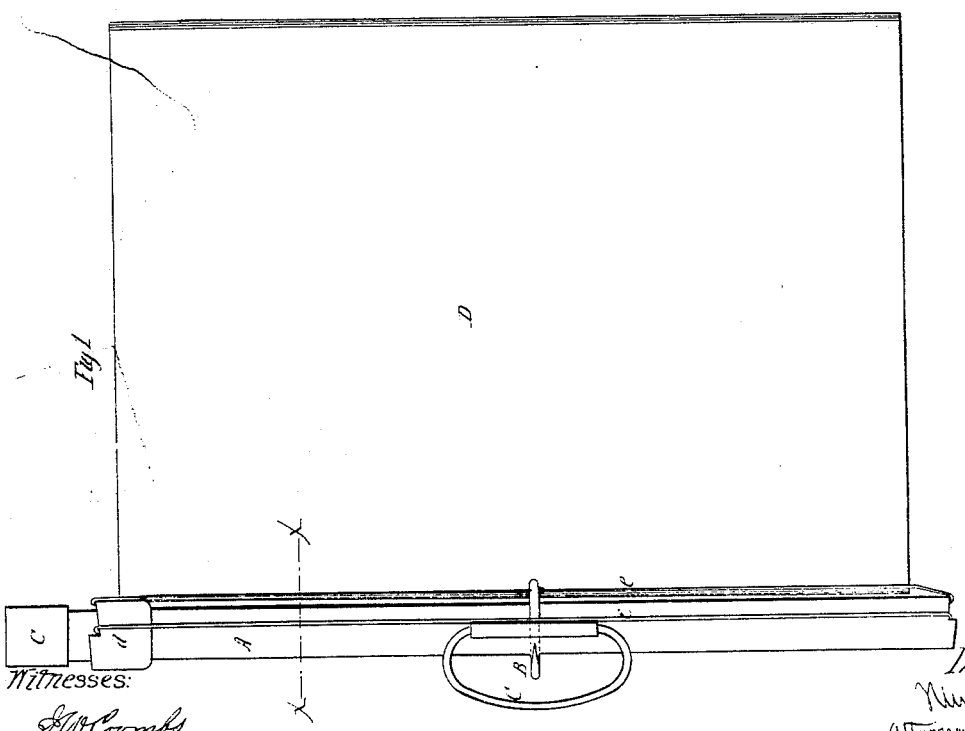
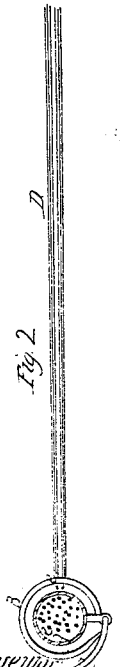
Witnesses:
J. W. Coombs.
A. S. Spencer
Inventor:
Munn & Co
attorneys for
J. B. McEnally